United States Patent

[11] 3,618,934

| [72] | Inventor | Richard W. Germuska |
| | | Cleveland, Ohio |
| [21] | Appl. No. | 38,025 |
| [22] | Filed | May 18, 1970 |
| [45] | Patented | Nov. 9, 1971 |
| [73] | Assignee | Addressograph-Multigraph Corporation |
| | | Cleveland, Ohio |

[54] FEED ROLL ASSEMBLY
9 Claims, 6 Drawing Figs.

| [52] | U.S. Cl. | 271/51 |
| [51] | Int. Cl. | B65h 5/06 |
| [50] | Field of Search | 271/51, 52, 53, 64, 57 |

[56] References Cited
UNITED STATES PATENTS

| 3,022,907 | 2/1962 | Palasciano | 271/57 X |
| 3,411,771 | 11/1968 | Bahr et al. | 271/51 |

*Primary Examiner*—Joseph Wegbreit
*Attorneys*—Russell L. Root and Ray S. Pyle

ABSTRACT: A feed roll assembly of two roll couples for transporting sheet material past a selected station at a uniform speed, each couple being separable under stress to allow for thick documents to be driven. The roll couples are interconnected with a linkage that allows initial independent separation movement of each of the roll couples, and thereafter separation movement of one of the roll couples will cause a corresponding but proportionately less separation of the other roll couple.

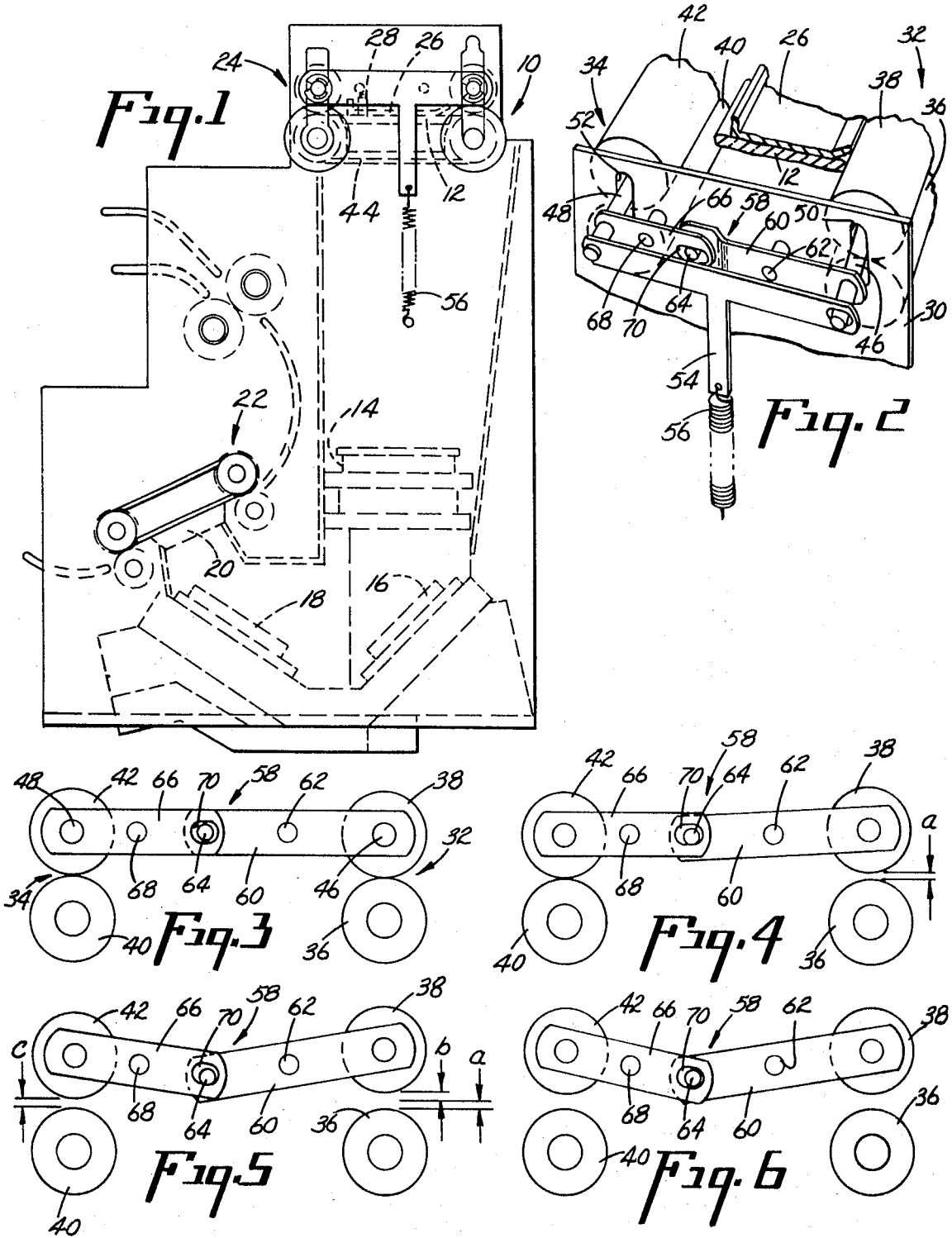

FEED ROLL ASSEMBLY

BACKGROUND OF THE INVENTION

This invention relates generally to feed roll assemblies, and more particularly to feed roll assemblies which incorporate first and second roller couples which can be separated to accommodate various thicknesses of documents.

There are many uses for feed roll assemblies wherein a flat sheet or document must be driven along a predetermined path. One such application for feed roll assemblies is in photocopying machines wherein an original document is moved past a scanning station at which the document is scanned. The image is transferred by an optical system from the scanning station to a sensitized master sheet which is simultaneously driven past an exposure station, at which station the image is transferred by the optical system to the sensitized master. It is in this environment that the device of the present invention is particularly useful, and as such presently constitutes the preferred embodiment.

In such a copying machine, it is necessary that the original document pass the exposure station in a flat level condition to thereby allow a true undistorted image to be transmitted by the optical system. If the original document is not flat and maintained on the proper plane, undesirable distortion can occur. For this reason, it has been common practice to provide two sets of drive rolls to drive the original document past the exposure station. One set of drive rolls is located at the entry side of the exposure station, and a second set of drive rolls is disposed at the exit end of the exposure station. An original document is fed through the entry rolls, and from the entry rolls is delivered past the exposure station to the exit rolls. The entry and exit rolls maintain the sheet on the proper plane and free of wrinkling and distortion as they simultaneously drive the document past the exposure station.

With copying machines, it is often desirable that they be able to accept copy sheets of substantial thickness, i.e., up to three-sixteenths inch or even one-fourth inch or more in thickness. If the driving rolls are maintained in contact with each other, thicker documents may tend not to become engaged by the bite of the rolls, and hence may jam at the entrance to the set of the driving rolls. The operator will usually overcome the resistance to the first set by applying manual assist, but when the lead edge of the original document reaches the second set, there will be a hesitation even though the operator does assist.

SUMMARY OF THE INVENTION

According to the present invention, a feed roll assembly for feeding copy sheets of various thicknesses past an exposure station is provided. The feed roll assembly includes an entrance set of first and second rolls at the entrance side of the exposure station, and an exit set of third and fourth rolls at the exit side of the exposure station. One of the rolls of each set is mounted for separation so that the rolls may accept thicker documents or allow projections to pass through. Further, the rolls are so interconnected that separation beyond a predetermined limit on the entrance set of rolls will cause a corresponding separation of the exit set. This will cause a positive separation of the exit set when the entrance set is separated, to prevent jamming of a thick object at the bight of the exit roll set after it has passed through the separated rolls of the entrance roll set. Further, this interconnection is so arranged that the roll on the exit set will move a lesser amount than the movable roll on the entrance set. This construction, wherein the exit set is separated slightly less than the entrance roll set, will assure that a positive driving engagement is maintained by both the roll sets on the exit and entrance side of the scanning station when they are separated to receive certain documents; i.e., the entrance roll separation setting is greater than the exit roll separation setting thereby insuring that exit rolls will engage and drive the documents coming from the entrance rolls, without requiring exacting manufacturing techniques as would be necessary if the sets were to be actuated uniformly. Also, the connection is such that slight separation of either set will not separate the other set in response thereto to thereby permit slight separation of either set to allow a momentary discontinuity, such as a paper clip or staple, to pass without separating the other set which could cause loss of driving engagement. The linkage may incorporate either of these conditions separately, but both of these conditions are preferred.

DESCRIPTION OF THE DRAWINGS

FIG. 1 is a side elevational view partially in section of the photocopying portion of a copy duplicator machine incorporating the feed roll assembly of this invention;

FIG. 2 is a perspective view showing in detail one end of the feed roll assembly according to this invention; and FIGS. 3, 4, 5 and 6 are diagrammatic end side elevational views showing the operation of the feed roll assembly at various positions of separation of the rolls of the different sets.

DESCRIPTION OF THE PREFERRED EMBODIMENT

Referring now to the drawings, and for the present to FIG. 1, a feed roll assembly according to this invention is shown incorporated in a device for photocopying the image from various documents hereinafter referred to as original documents onto a sensitized master. This presently constitutes the preferred use of the feed roll assembly of this invention, but it is to be understood that the use of this type of feed roll assembly is not limited to this specific device but finds application in other devices where feeding of original documents of various thickness past a station is required, wherein the original documents must be maintained flat and unwrinkled.

The photocopying machine of this invention includes a frame 10 which has at the upper portion thereof a glass plate 12 which is designed to support an original document which is passed thereacross and provide a scanning station therefor. The image on the original document at the scanning station is projected through a lens designated as 14 to a mirror system having specifically angled mirrors 16 and 18 and then to a master exposure station 20, past which a sensitized master sheet is moved by means of a master sheet drive roll assembly designated as 22.

The original document is driven past the scanning station by means of a feed roll assembly designated generally as 24. This feed roll assembly is adapted to drive the original document past the scanning station in synchronization with the roll set 22 which drives the sensitized master past the master exposure station 20.

Also disposed at the scanning station is a backing plate 26 which is mounted for vertical sliding movement on pins, one of which is shown at 28. The backing plate 26 is provided with a white underside and is adapted to overlie the copy sheet as it moves past the scanning station. The underside of the plate 26 is painted white so that in the scanning, the outside edges will develop white no matter what width of document is used. This will prevent dark streaks from being projected on the edges when narrow original documents are copied.

As was explained above, it is often desirable that rather thick original documents be passed through the feed roll assembly across the exposure station. The mounting which permits a separation of the rolls while still maintaining positive drive relationship, and also allow a small amount of independent movement to permit passage of short discontinuity, such as staples or the like past each roll set without loss of drive on the other set is shown in detail in FIGS. 2 through 6 as the preferred embodiment. It is possible to cause both rolls of a set to move, but such possibility adds cost.

Referring now to FIG. 2, the mounting and interconnecting linkage for the drive roll assembly at one end of each of the roll sets is shown in detail. It is to be understood that a similar mounting and linkage devices are provided at the opposite ends of the rolls.

The drive roll assembly includes a mounting side frame 30 which mounts a set of entrance rolls 32 at one side of the exposure station and a set of exit rolls 34 at the exit side of the exposure station. The roll set 32 includes a lower roll 36 and an upper roll 38 and the exit roll set 34 includes a lower roll 40 and an upper roll 42.

Each of the lower rolls 36 and 40 are driven rolls, the driving interconnection being indicated schematically by a pulley or chain 44 shown in FIG. 1. The upper rolls 38 and 42 are provided respectively with shafts 46 and 48 which extend respectively through vertically extending slots 50 and 52 formed in the frame 30. This allows for each of the rolls 38 and 42 to move upwardly away from their respective lower rolls 36 and 40 to widen the bite of the rolls to thereby permit thicker copy sheets to be passed therethrough without jamming or to allow a discontinuity such as a staple to pass by.

The shafts 46 and 48 are interconnected by a T-shaped link 54 which is biased downwardly by a spring 56 to maintain a positive engagement of the rolls 38 and 42 with the top of the copy sheet being driven thereby.

A linkage mechanism designated generally as 58 also provides interconnection of the shafts 46 and 48. Linkage mechanism 58 will allow the exit roll to move in a delayed response to separation movement of the entry roll. Movement of the upper exit roll opening the bite of the exit roll set will prevent binding and a jam in the machine when a thick object is delivered from the entrance roll set. Such a jam could occur if the entrance rolls, but not the exit rolls, were separated a sufficient distance to accept a thicker copy sheet or projection. For example, if the entrance rolls were spaced widely and driving a thick copy sheet and the exit rolls were not, the thick object would be driven past the exposure station, and the end thereof would come into contact with the exit roll set 34. As explained above, when the thickness of the sheet is greater than a given value, the bite of the rolls will no longer accept and drive the sheet, but rather it will just rotate thereagainst preventing further movement, or at least cause a slowing as the document forces it way into the bite. In such a case, the second roll assembly 34 acts as a stop surface against which the entrance set of the rolls 32 will drive the sheet, thus causing hesitation or actually a buckling of the sheet and jamming in the machine.

In order to prevent this, the linkage 58 causes the upper exit roll 42 to raise responsive to movement of the upper entrance roll 38. However, if the exit roll were raised exactly with the entrance roll, perfect tolerances would be necessary in order to be assured of a continued driving relationship of both the exit rolls and the entrance rolls with respect to the original document. For example, if the construction of the machine were such that the exit roll 42 were to raise even slightly more than the entrance roll, it would not effectively engage the sheet for proper operation of the feed roll assembly. The linkage is such that the distance the exit roll is raised responsive to the raising of the entrance roll is less than the distance the entrance roll is raised. Also, if a projection or discontinuity on the surface of the copy sheet, such as a paper clip or staple were to cause the movable entrance roll to raise and thus in turn the exit roll to move the same amount, the exit rolls would lose driving contact. Therefore, the linkage 58 is so configured in construction to allow both the upper entry roll 38 and the upper exit roll 42 to move a small distance upwardly without causing responsive movement of the other upper roll.

Refer to FIGS. 3 and through 6, the linkage assembly 58 includes a first link 60 pivotally mounted to the frame 30 by a pivot pin 62. One end of the link 60 is pivotally connected to the shaft 46, and the other end carries an actuating pin 64. A second link 66 is also provided pivotally mounted to the frame 30 by a second pivot pin 68. One end of the link 66 is pivotally connected to the shaft 48, and the opposite end is provided with a slot 70 disposed in operative engagement with the pin 64. As can best be seen in FIGS. 3 through 6, the slot 70 is both longer and wider than the diameter of the actuating pin 64.

Referring to FIGS. 3 through 6, the operation of the linkage system is shown diagrammatically.

In FIG. 3, the roll assembly is shown in its normal downward position wherein both upper rolls are contacting both lower rolls in normal driving engagement therewith. In this position, the pin 64 is located about centrally of the length of slot 70 and near the top thereof. With a thin sheet original document this would be virtually the position of the rolls when driving the paper.

FIG. 4 shows the upper entrance roll 38 raised slightly from the lower entrance roll 36, the distance designated as "$a$." This slight initial movement, it will be observed, has rotated the link 60 to change the position of the pin 64 in the slot 70 so that it has moved from a position centrally of the slot 70 to a position near the bottom thereof. However, this movement has been within the confines of the slot 70 and has not resulted in any driving engagement of the pin 64 with the sides of the slot 70 so it has not resulted in the pivoting of the link 66. Since the link 66 has not pivoted, the upper exit roll 42 has not moved. This would be the position the roll 38 could rotate to allow a momentary discontinuity to pass without affecting the driving engagement of the roll 42. (Similarly, it will be noted that the exit roll 42 could raise a small distance without affecting the position of the entrance roll 38). Continued movement upwardly of the roll 38 past the distance "$a$," which is represented by an additional distance "$b$" in FIG. 5, will cause further rotation of the link 60, thereby causing the pin 64 to bear against the edge of the slot 70, thereby pivoting the link 66, causing the upper exit roll 42 to pivot upwardly in response to this pivotal movement of the link 66. This upward movement is designated by the distance "$c$." The relative distances of distance "$b$" and "$c$" are dependent upon the length of the links 60 and 66, the position of the pivotal mounting and the locations of the pin 64 and the slot 70. These lengths and positions are so chosen that the amount of movement of the exit roll 42 is less than the corresponding movement of the upper entrance roll 38, i.e., the distance "$a$" plus "$b$" is greater than the distance "$c$". Preferably, the ratio of the distance "$c$" to "$a$" plus "$b$" should be about 9 to 10.

The position shown in FIG. 5 is that which the rolls would assume when a thick document has entered the entrance roll set 32, but has not yet reached the exit roll set 34. When the original document does reach the exit roll set 34, it will raise roll 42 to the position shown in FIG. 6. In this position the rolls of both sets will be equally spaced. It will also be noted that in FIG. 6 the pin 64 is located about centrally (in a vertical direction) of the slot 70 just as in FIG. 3. Hence, either roll 38 or 42 can move slightly without affecting the other to allow momentary discontinuity to pass.

Thus, by providing a linkage having a lost motion and a distance reducing interconnection, the entrance upper roll of the feed roll assembly can be raised a greater degree than the exit upper roll to thereby allow for tolerances in manufacturing and still provide a positive drive interconnection of the exit rolls, and also provide for passing of momentary discontinuity through either of the roll sets without affecting the other set.

What is claimed is:

1. A feed roll assembly for feeding a flat sheet past a station in a smooth unwrinkled condition, said station having an entrance and an exit side, comprising:

an entrance set of first and second driving rolls at the entrance side of said station, an exit set of third and fourth driving rolls at the exit side of said station, each set of rolls being adapted to engage and drive the sheet to feed it past the station;

means mounting said rolls of each set for relative separation, and connection means interconnecting said sets of rolls for separation of said exit set as a function of separation of said entrance set, separation of said exit set being a distance which is a fractional portion of the distance which said entrance set is separated.

2. The invention as defined in claim 1 wherein said connection means includes mechanical linkage means.

3. The invention as defined in claim 2 wherein said mechanical linkage includes first and second link members connected respectively to said first and third rolls, said first and second link members being pivotally mounted to move said rolls.

4. A feed roll assembly for feeding a flat object past a station in a smooth unwrinkled condition comprising:
- an entrance set of first and second driving rolls at one side of said station;
- an exit set of third and fourth driving rolls at the other side of said station, each set of rolls being adapted to drivingly engage the object to feed it past the station;
- means mounting said first and third rolls for separation movement toward and away from said second and fourth rolls respectively; and
- connection means interconnecting said first and third rolls for moving said third roll responsive to the movement of said first roll, an initial predetermined distance away from said second roll before moving said third roll away from said fourth roll, whereby to allow passage of momentary discontinuities through said set without loss of drive at said exit roll set.

5. The invention as defined in claim 4 wherein said connection means includes mechanical linkage means.

6. The invention as defined in claim 5 wherein said mechanical linkage includes a lost motion connection.

7. The invention as defined in claim 4 wherein said connection means is configured to allow both said first and third rolls to move an initial distance without moving the other.

8. The invention as defined in claim 4 further characterized by said connection means being configured and arranged to cause the movement of said third roll away from said fourth roll in response to the movement of said first roll away from said second roll to be a distance which is a fraction less than one of the distance moved by said first roll.

9. The invention as defined in claim 8 further characterized by said connection means including mechanical linkage means, said linkage means having pivotally mounted link members which have a lost motion connection.

* * * * *